(12) United States Patent
Andersson

(10) Patent No.: US 12,152,623 B2
(45) Date of Patent: Nov. 26, 2024

(54) INSULATION SCREW AND METHOD FOR INSERTING SUCH AN INSULATION SCREW

(71) Applicant: EUROSPACERS AB, Gothenburg (SE)

(72) Inventor: Stefan Andersson, Stenkullen (SE)

(73) Assignee: EUROSPACERS AB, Gothenburg (SE)

( * ) Notice: Subject to any disclaimer, the term of this patent is extended or adjusted under 35 U.S.C. 154(b) by 923 days.

(21) Appl. No.: 16/962,815

(22) PCT Filed: Jan. 18, 2019

(86) PCT No.: PCT/SE2019/050031
§ 371 (c)(1),
(2) Date: Jul. 16, 2020

(87) PCT Pub. No.: WO2019/143284
PCT Pub. Date: Jul. 25, 2019

(65) Prior Publication Data
US 2021/0033137 A1   Feb. 4, 2021

(30) Foreign Application Priority Data

Jan. 18, 2018   (SE) .................................. 1850055-3

(51) Int. Cl.
*F16B 33/02*   (2006.01)
*E04B 1/76*   (2006.01)
(Continued)

(52) U.S. Cl.
CPC ............ *F16B 33/02* (2013.01); *E04B 1/7629* (2013.01); *E04B 1/7637* (2013.01);
(Continued)

(58) Field of Classification Search
CPC ... E04B 1/7629; E04B 1/7637; E04D 3/3603; E04D 5/145; F16B 25/0047;
(Continued)

(56) References Cited

U.S. PATENT DOCUMENTS 1,844,823 A * 2/1932 Rosenberg .......... F16B 25/0078
411/425
3,541,918 A * 11/1970 Johnson .............. F16B 25/0031
411/938
(Continued)

FOREIGN PATENT DOCUMENTS

CA       2686615 A1 * 5/2010  .......... B25B 21/002
DE  202009000844 U1 * 5/2009  ......... E04D 13/1643
(Continued)

OTHER PUBLICATIONS

International Search Report and the Written Opinion for International Application No. PCT/SE2019/050031, dated Apr. 12, 2019 in 11 pages.

*Primary Examiner* — Jessie T Fonseca
(74) *Attorney, Agent, or Firm* — Knobbe, Martens, Olson & Bear, LLP

(57) ABSTRACT

Insulation screw adapted to be inserted by a mounting device into insulation material, where the insulation screw comprises a body provided with at least one thread, where the tip of the body is pointed, where the outer diameter of the head is equal to or smaller than the outer diameter of the body and where the lead pitch of the thread is at least 30 millimetres. An insulation screw can be driven completely through a central opening since the insulation screw does not have a protruding head. The insulation screw is provided (Continued)

with a thread and the opening of a mounting device is provided with a corresponding threaded portion, such that the insulation screw is screwed into the insulation material by a non-rotating pushing force.

14 Claims, 7 Drawing Sheets

(51) Int. Cl.
| | |
|---|---|
| *E04D 3/36* | (2006.01) |
| *E04D 5/14* | (2006.01) |
| *F16B 25/00* | (2006.01) |
| *F16B 33/00* | (2006.01) |
| *F16B 35/06* | (2006.01) |
| *E02D 31/00* | (2006.01) |
| *E04B 1/74* | (2006.01) |
| *F16B 27/00* | (2006.01) |

(52) U.S. Cl.
CPC ............ *E04D 3/3603* (2013.01); *E04D 5/145* (2013.01); *F16B 25/0047* (2013.01); *F16B 25/0073* (2013.01); *F16B 33/006* (2013.01); *F16B 35/06* (2013.01); *F16B 35/065* (2013.01); *E02D 31/00* (2013.01); *E04B 1/74* (2013.01); *F16B 25/0068* (2013.01); *F16B 27/00* (2013.01)

(58) Field of Classification Search
CPC .. F16B 25/0068; F16B 25/0073; F16B 27/00; F16B 33/02; F16B 33/006; F16B 35/06; F16B 35/065
See application file for complete search history.

(56) References Cited

U.S. PATENT DOCUMENTS

| | | | | |
|---|---|---|---|---|
| 4,167,229 | A | * 9/1979 | Keusch | .................... F16B 27/00 |
| | | | | 206/343 |
| 2015/0300004 | A1 | * 10/2015 | Ter-Borch | ............. E04B 1/7629 |
| | | | | 52/506.05 |
| 2016/0138640 | A1 | * 5/2016 | Chen | .................... F16B 25/0078 |
| | | | | 411/416 |
| 2016/0208842 | A1 | * 7/2016 | Lin | ...................... F16B 25/0031 |
| 2019/0162221 | A1 | * 5/2019 | Lin | ...................... F16B 25/0047 |
| 2021/0239150 | A1 | * 8/2021 | Wynne | .................. F16B 37/145 |

FOREIGN PATENT DOCUMENTS

| | | | | |
|---|---|---|---|---|
| DE | 202016102730 | U1 | 6/2016 | |
| DE | 102020207059 | A1 * | 12/2021 | ........... E04D 3/3603 |
| EP | 2098736 | A1 * | 9/2009 | ........... F16B 13/141 |
| EP | 2206931 | A2 * | 7/2010 | ......... F16B 25/0031 |
| EP | 2354567 | A1 * | 8/2011 | ............. F16B 13/02 |
| EP | 2581611 | A1 * | 4/2013 | ........... F16B 13/141 |
| EP | 3150773 | A1 * | 4/2017 | |
| EP | 3862580 | A1 * | 8/2021 | ......... F16B 25/0026 |
| GB | 2436727 | A * | 10/2007 | ........ E04D 13/1618 |
| KR | 20070042937 | A | 4/2007 | |
| WO | 93/13277 | A1 | 7/1993 | |
| WO | WO-0213990 | A1 * | 2/2002 | ............. B21F 45/16 |
| WO | WO-2012152237 | A1 * | 11/2012 | ........... F16B 13/141 |
| WO | 2014/105416 | A1 | 7/2014 | |
| WO | WO-2021054744 | A1 * | 3/2021 | ........... E04B 1/2403 |

\* cited by examiner

INSULATION SCREW AND METHOD FOR INSERTING SUCH AN INSULATION SCREW

CROSS-REFERENCE TO RELATED APPLICATIONS

This application is the U.S. National Phase under 35. U.S.C. § 371 of International Application PCT/SE2019/050031, filed Jan. 18, 2019, which claims priority to Swedish Patent Application No. 1850055-3, filed Jan. 18, 2018. The disclosures of the above-described applications are hereby incorporated by reference in their entirety.

TECHNICAL FIELD

The present invention relates to an insulation screw to be inserted in insulation panels and/or insulation blocks. Insulation panels are used to create a large insulation bed for a concrete foundation. The separate insulation panels are held together by insulation screws inserted through the insulation panels.

BACKGROUND ART

Concrete constructions are normally provided with some kind of reinforcement to increase the strength and to prevent cracking. The reinforcement can be single reinforcement bars (rebars), reinforcement grids/meshes or different kinds of fibres or other. Most common are reinforcement grids/meshes made from reinforcement bars of steel when larger areas are to be covered in a fast and time-efficient manner. For smaller areas or as a complement to the grids, single reinforcement steel bars are often used.

The concrete construction, e.g. the foundation, may be placed directly on the ground or may be placed on insulation. The insulation often consists of large blocks or panels of an insulation material, e.g. of expanded polystyrene (EPS) or extruded polystyrene foam (XPS). These materials comprise closed cells, which gives rigid and tough insulation plates or blocks, which in turn will give the foundation a low thermal conductivity.

The insulation bed is often assembled from a plurality of insulation panels arranged in one or more layers. In order to provide a higher strength and a lower thermal conductivity, the insulation panels are stacked with overlapping layers. The insulation panels are often attached to each other with insulation nails or insulation screws in order to hold the insulation panels together and to minimize the distance between the insulation panels. The insulation panels are attached to each other by the use of the nails or screws, often by attaching two or three layers to each other at the time. The screws of the top layer may not be inserted all the way, such as part of the screw sticks out of the top insulation layer. This will allow the concrete to include the screw heads in the concrete, such that the insulation will be attached to the concrete even if the ground under the insulation should sink. The nails may also be used to attach the insulation panels to the concrete.

The insulation nails or screws thus have two main purposes. One purpose is to attach the insulation panels to each other, the other purpose is to attach the insulation panels to the casted floor, wall or foundation.

An insulation nail resembles an ordinary nail, but the head is larger and flat, the nail is made from plastic material and the tip is provided with barbs. One nail at the time is inserted into the insulation by first inserting the tip into the insulation by hand, and then pressing the complete nail into the insulation by hand, a foot or a hammer. The insertion of a nail is thus relatively slow and requires the user to bend down each time a nail is inserted. A further disadvantage of insulation nails are that the barbs will deform the insulation during the insertion, which will decrease the possible holding force of the insulation nails. Insulation nails are thus mostly used to hold insulation panels together preventing horizontal movements, and not that often when the insulation is to be attached to the foundation. Further, since the holding force for the insulation nail is between the head and the barbs at the tip, the length of the nail must be selected in dependency of the dimensions of the insulation panels.

An insulation screw resembles an ordinary screw, but is larger with a larger head and with a thread arranged only at the tip of the screw. Insulation screws are commonly used when insulation is to be attached to concrete in a vertical direction. The insulation screw is normally inserted by using an electric screwdriver but a user must normally bend down to start the insertion. With a long screw bit, the user may stand up during most of the insertion. The insertion will even though be relatively slow, since the complete screw must be screwed in to the insulation. Insulation screws are further relatively expensive. Since the holding force for the insulation screw is between the head and the threads at the tip, the length of the screw must be selected in dependency of the dimensions of the insulation panels.

One disadvantage of an insulation screw is that the insulation screw is designed to pull itself into the insulation material with the threaded section. If the user does not apply an appropriate pressure on the insulation screw during the insertion, or does not use an appropriate rotational speed to rotate the insulation screw, the threaded section may instead function as a drill that will destroy the insulation material around the threaded section. In this case, the insulation screw will provide a minimum of holding force. This problem is especially cumbersome for low-density insulation materials.

Insulation screws of the above described types functions, but are relatively time consuming to insert and relatively costly to use. There is thus room for an improved insulation screw adapted to be inserted by a mounting device and a method for inserting insulation screws.

DISCLOSURE OF INVENTION

An object of the invention is therefore to provide an improved insulation screw adapted to be inserted by a mounting device. A further object of the invention is to provide an improved method for inserting insulation screws.

The solution to the problem according to the invention is described in the characterizing part of claim 1 regarding the insulation screw and in claim 14 regarding the method. The other claims contain advantageous embodiments and further developments of the insulation screw and the method.

In an insulation screw adapted to be inserted by a mounting device into insulation material, where the insulation screw comprises a body provided with at least one thread, where the tip of the body is pointed, and where the cross section of the head is equal to or smaller than the cross section of the body, the object of the invention is achieved in that the lead pitch of the at least one thread (35) of the insulation screw is at least 30 millimetres.

By this first embodiment of an insulation screw according to the invention, an insulation screw can be inserted into insulation material in a quick and reliable way by the use of a mounting device. The insulation screw is intended to be used to attach two or more insulation panels or blocks to each other, e.g. when creating an insulation bed for a foundation. An insulation screw is inserted into the mounting device and the drive means will then drive the insulation screw through the lower central opening of the mounting device and into the insulation material. The insulation screw is provided with at least one thread having a lead pitch of at least 30 millimetres, and the central opening is provided with a threaded portion corresponding to the thread of the insulation screw. The drive means is adapted to drive the insulation screw completely through the threaded section of the central opening. For this reason, the insulation screw does not comprise a head having a diameter or shape that exceeds the body of the insulation screw. By inserting the insulation screw completely through the threaded section of the central opening, the insulation screw can be inserted in one operation step, which will save time. Since the drive means can be operated when the user stands up straight, the ergonomic of the insertion is improved. With the inventive insulation screw, a user can insert several insulation screws after each other without having to bend down.

A further advantage of the inventive insulation screw is that it can be inserted into insulation material without the risk of damaging the insulation material. A conventional insulation screw is designed to pull itself into the insulation material with its threaded section. If the insulation screw is inserted without an appropriate pressure on the insulation screw during the insertion, or if the insulation screw is inserted without an appropriate rotational speed, the threaded section of the insulation screw will function as a drill that will destroy the insulation material around the threaded section. In this case, the insulation screw will provide a minimum of holding force.

With the inventive insulation screw, the insertion and rotation of the insulation screw is controlled by the threaded portion of the central opening. In this way, the insulation screw only rotates when it is pushed downwards. It is thus ensured that the insulation screw is inserted into the insulation material with a rotational movement. The rotation will create a passage in the insulation material having a threaded shape. If required, the insulation screw can be inserted further into the insulation material when it has passed the threaded section of the central opening, since it will continue to follow the created threaded passage if it is pushed further down.

The drive head is adapted to not rotate during insertion of an insulation screw. The central opening of the head portion of the mounting device is provided with a threaded portion adapted to cooperate with the thread of the insulation screw. Before insertion, the insulation screw is held in place with the tip of the insulation screw positioned at the central opening. When the drive head is moved downwards, the insulation screw is pushed through the central opening, and the thread of the insulation screw and the thread of the threaded portion will cause the insulation screw to rotate. Since the head portion of the mounting device bears on the insulation material, the insulation screw will be inserted into the insulation with a rotating movement, corresponding to the lead pitch of the insulation screw. When the drive head has passed through the threaded section of the central opening, the insertion is completed. The drive head can return to the idle position by the user pulling the drive head upwards, or by a spring loaded return mechanism.

The insulation screw can be provided with one or more threads, e.g. two, three or four threads. The lead pitch is preferably relatively long, such that the insulation screw will be inserted with relatively few rotations. Thread pitch is defined as the axial distance between adjacent threads on a screw. The lead pitch of the screw is the distance along the screw's axis that is covered by one complete rotation of the screw. For a multiple start screw, the lead pitch is equal to the number of threads or number of starts multiplied with the thread pitch. For a single start screw, the thread pitch is equal to the lead pitch. In order to increase the holding force for an insulation screw having a long thread pitch, it is preferred to provide the insulation screw with several threads, e.g. two, three or four threads. The lead pitch is preferably at least 30 mm, and is in one example 80 mm with four threads.

It is preferred to have a relatively long lead pitch, which will allow the insulation screw to get a good grip in the insulation material, since there will be enough insulation material between each thread. A relatively long lead pitch will also allow for the insulation screw to be pushed through the threaded portion of the central opening with a time saving non-rotating movement. With a short lead pitch, the friction in the threaded portion will be too high to allow an insulation screw to be pushed through without a rotational movement of the drive head. The lead pitch and the width of the insulation screw may also depend on the insulation material used. Some insulation materials are relatively porous with a low density while other insulation materials are denser with a higher density. A porous insulation material is more suited for a longer lead pitch.

The drive head is provided with a gliding surface that will glide against the pushing surface of the insulation screw when the insulation screw is inserted. The drive head is guided in a central channel of the mounting device. The central channel is provided with a longitudinal slot on one side, such that an insulation screw can enter the interior of the mounting device from the side. In this way, an insulation screw can enter the mounting device without having to remove the drive head of the mounting device each time an insulation screw is to be loaded into the mounting device. A user can insert a single insulation screw through the slot, but the mounting device may be provided with a second channel and a removable magazine arranged at the second channel, such that an automatic loading of insulation screws can take place. The magazine is preferably reusable and may be loaded with new insulation screws by a user. The mounting device may also be provided with a magazine directly coupled to the central channel, such that the insulation screws enter the receiving position directly.

The drive means of the mounting device may be either operated manually or by an electric motor. A manually operated drive means may comprise a handle and/or a foot pedal. When an electric motor is used for the drive means, a non-rotating drive head may be used. A non-rotating drive head is achieved by e.g. providing the inside of the body with an internal thread or groove which cooperates with a thread or pin of the drive head. It would e.g. be possible to adapt the mounting device such that it can use any commercially available electric screwdriver as the drive means.

With a manually operated drive means, the mounting device is provided with a pedal and/or a handle that is adapted to move the drive head from a start position to an end position. In one example, the drive means is a handle. The handle is connected to the drive head by a rod, and when the handle is pressed down, the drive head is pressed down and will push the insulation screw down into the insulation material.

In another example, a foot pedal adapted to be operated by the foot of a user is used. The pedal is applied at the lower end of the mounting device, such that it is easy to reach with a foot. The height of the pedal is adapted to the length of an insulation screw that is to be inserted. The height of the pedal may be adjusted to correspond to the used insulation screw. When an insulation screw is loaded into the mounting device, the pedal is pressed such that the drive head moves from the start to the end position and the insulation screw is inserted into the insulation material. The pedal may be connected to the handle, such that a user may use either a hand, a foot or both to insert an insulation screw.

The drive head has a stroke length corresponding to the longest insulation screw that is to be inserted. The length of an insulation screw may e.g. vary between 5 cm to up to 40 cm. The stroke length of the drive head is thus preferably in the same region. In one example, the stroke length of the drive head may be adjusted to the actual length of an insulation screw. In this way, no excessive travel of the drive head must be performed every time an insulation screw is inserted. The start position of the drive head is in one example adjustable to a selected position. In this way, it is possible to adapt the start position of the drive head to the length of the used insulation screw.

The end position of the drive head is in one example adjustable to a selected position. The end position is normally set to the position in which the insulation screw has been inserted into the insulation, and where the drive head is aligned with the bearing surface of the head portion. In this position, the drive head has just passed through the central opening. The end position may be set such that the insulation screw is not completely inserted at the end position. The insulation screw may in this case extend out of the insulation material by up to a few centimetres, and preferably between 1-3 cm. With the insulation screw extending out of the insulation material, the concrete of the foundation will cover the extended part of the insulation screw such that the insulation screws will be fixed to the concrete. The insulation will now be attached to the foundation in a secure way even if the ground will sink.

In the method for inserting an insulation screw having a lead pitch of at least 30 millimetres into insulation material using a mounting device comprising an opening provided with a threaded portion corresponding to the thread of the insulation screw, the following steps are comprised. An insulation screw is placed inside the mounting device such that the tip of the insulation screw is positioned at the opening of the mounting device. The insulation screw may be placed in the mounting device one by one, or may be placed in position automatically from a magazine loaded with insulation screws. The mounting device is placed to bear against the insulation material with a bearing surface comprised in a head portion of the mounting device. The insulation screw is driven into the insulation material by the mounting device, where the insulation screw is driven through the threaded portion of the opening of the mounting device, where the opening is provided with a threaded portion corresponding to the insulation screw. The drive head may be aligned with the bearing surface when the insulation screw is inserted in the insulation material.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
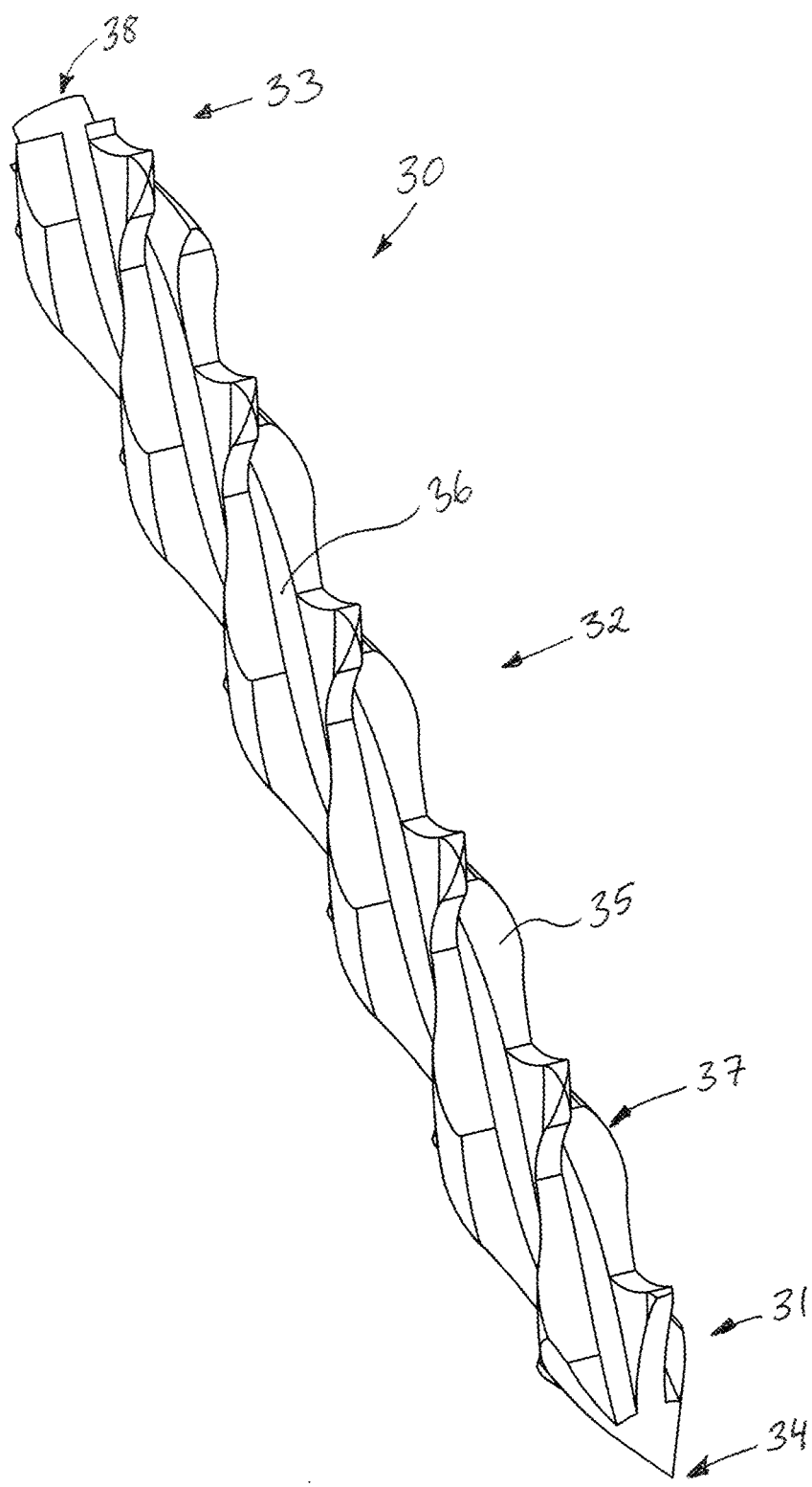
FIG. 1 shows a first embodiment of an insulation screw according to the invention.

FIG. 1 shows a first example of an insulation screw 30 that is adapted to be inserted with a mounting device 1. The insulation screw is adapted to be inserted with a straight, non-rotating movement and is adapted to interact with a threaded opening in the head portion of the mounting device. In this way, the insulation screw will be inserted into the insulation material with a rotating movement, and the insulation screw will be screwed into the insulation material.

The insulation screw shown in FIG. 1 is provided with four threads. The insulation screw comprises a tip 31, a body 32 and a head 33. The tip is preferably pointed with a sharp point 34. This will simplify the insertion of an insulation screw into the insulation material. The body 32 comprises a core 36 and at least one thread 35. The body 32 is elongated with a solid core 36 that is provided with the threads 35. The head 33 is the upper part of the insulation screw and the cross section of the head may be smaller than the cross section of the body of the insulation screw, or may have the same cross section. By letting the head be of equal size or smaller than the body of the insulation screw, the insulation screw can be pushed through an opening in a head portion of a mounting device. The upper surface of the head 33 is provided with a pushing surface 38, which is the surface on which the drive head of the mounting device interacts with the insulation screw. The pushing surface may be flat or may have a convex shape, corresponding to the shape of the bearing surface of the drive head. A convex shape is of advantage since sharp edges of the insulation screw can be avoided, which minimizes the risk of injury at a working site, especially if the insulation screws extend out of the insulation material.

In the shown example, the diameter of the head corresponds to the diameter of the core of the insulation screw. In this way, the head will easily pass through the opening of the mounting device. The length of the head can vary, and may be e.g. up to 3 centimetres. The head will correspond to the opening in the bushing of the drive head of the mounting device, such that the bushing will be able to guide the insulation screw in a secure way. The head may also be the upper part of the insulation screw, i.e. the upper part of the threaded body. In this case, the opening of the bushing must be larger, such that the bushing can also grip the thread of the insulation screw.

The threaded body of the insulation screw may have a different number of threads and may have a different lead pitch. In one example, the insulation screw comprises four threads with a lead pitch of approximately 80 millimetres. The outer diameter of the insulation screw is 16 millimetres, the core diameter is 6 millimetres and the shown length is 12 centimetres. Other numbers of threads and other dimensions are of course possible, depending on the intended use of the insulation screw. The lead pitch must be relatively large in order to be able to push an insulation screw through the threaded portion of the central opening of the mounting device. A suitable lead pitch is at least 30 millimetres or more, and may e.g. be in the range between 60-90 millimetres. At the same time, a too long lead pitch will decrease the holding force of an insulation screw in the insulation material. A lead pitch is thus preferably below 100 millimetres. Outer diameters of the body between 10-40 millimetres may be used, and lengths between 5-40 centimetres are possible. The relation between the outer diameter and the core of the insulation screw can also be increased in order to increase the holding force. In the described example, the ratio is somewhat below 40%, but a ratio of down to 30% or lower is possible, depending on the length of the insulation screw.

The shown insulation screws are made in a plastic material. The material may be fibre reinforced if the requirements are high. Polypropylene is one suitable plastic material. In the shown example, the outer edge 37 of a thread varies in height from the core. By allowing the outer edge of a thread to vary in height, it is possible to injection mould the insulation screw in a two-part injection tool. This simplifies the production of insulation screws considerably. The thread is still continuous enough to be able to cooperate with the threaded portion of a central opening.

Figure 2:
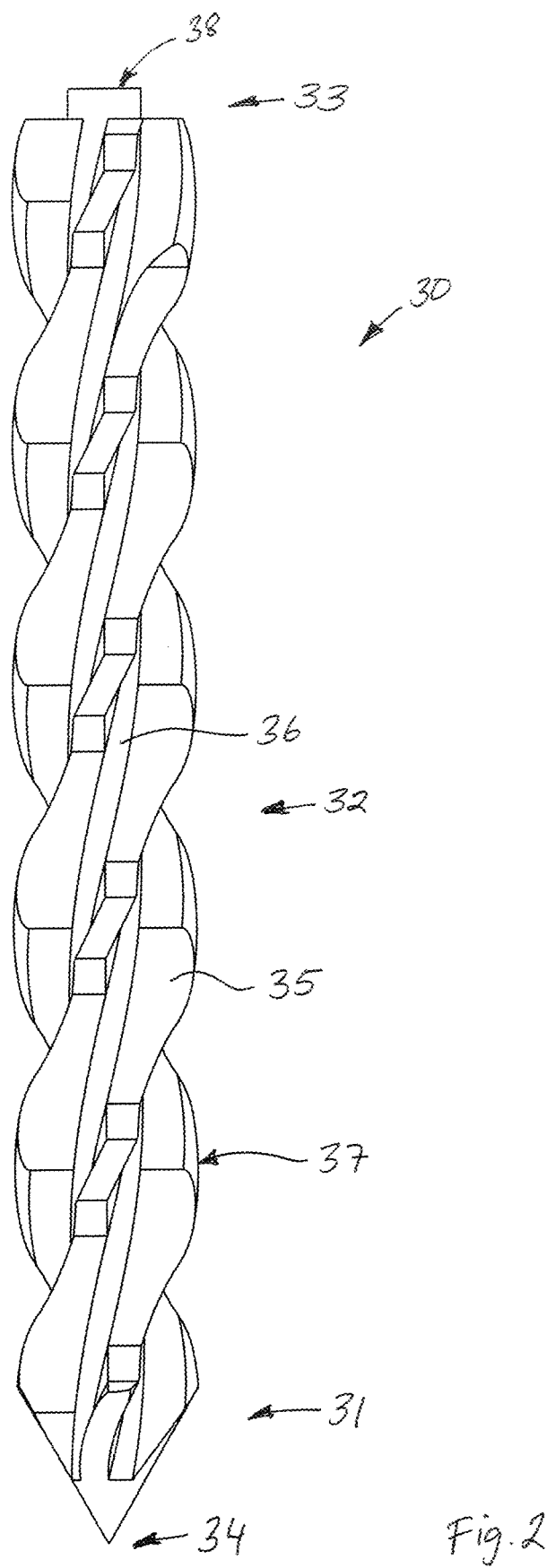
FIG. 2 shows a side view a the insulation screw of FIG. 1.
Figure 3:
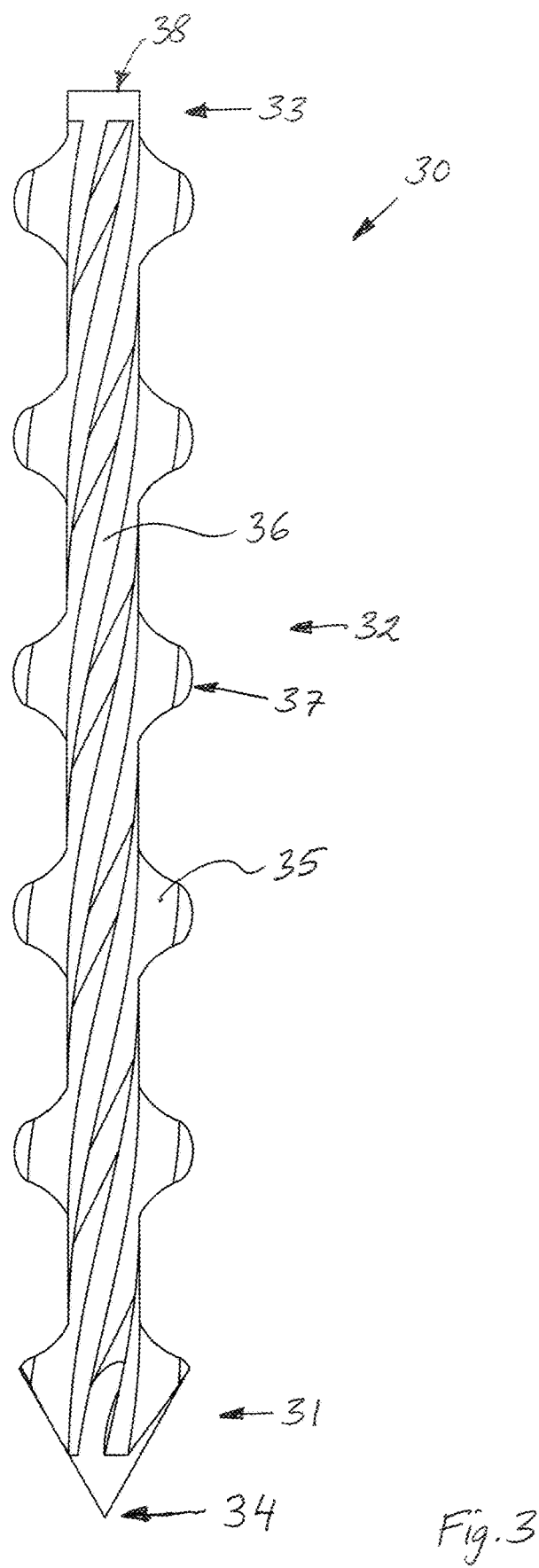
FIG. 3 shows a perpendicular side view of the insulation screw of FIG. 1.

FIG. 2 shows a first side view of an example of an insulation screw. This view is parallel to the split line of the insulation screw and to the split plane of the injection tool. FIG. 3 shows a side view which is perpendicular to the split line of the insulation screw and to the split plane of the injection tool. FIG. 3 thus corresponds to a view in which the insulation screw is positioned in one half of the injection tool. Since the insulation screw is provided with four threads, and since the insulation screw is injection moulded in a two part injection tool, the distance between the outer edges 37 of a thread to the core 36 varies along the length of the insulation screw. The varying shape of the outer edge of the threads is here clearly visible.

Figure 4:
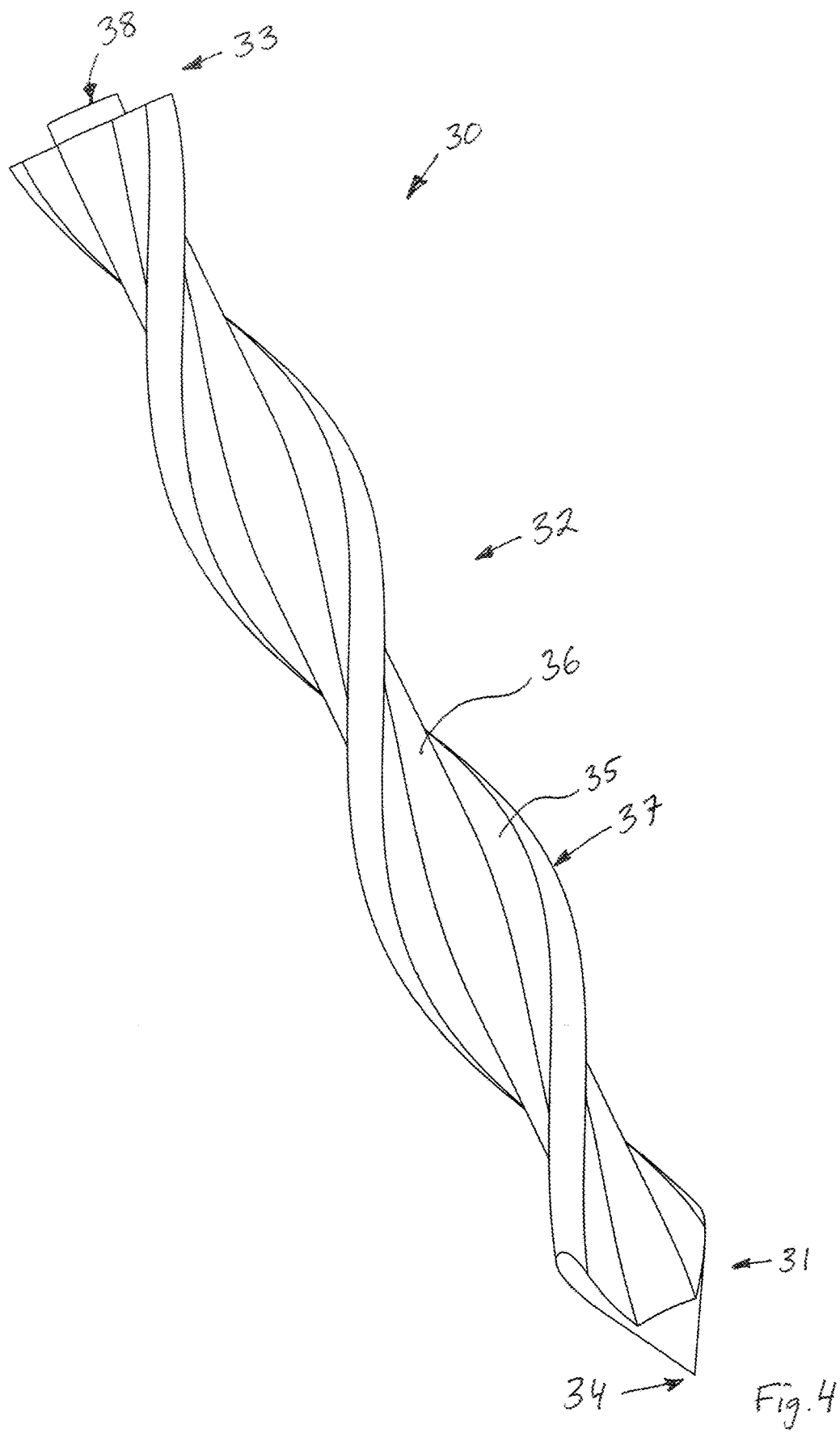
FIG. 4 shows a second example of an insulation screw according to the invention.

FIG. 4 shows a second example of an insulation screw. In this example, the insulation screw is provided with two threads. Due to the smaller number of threads and another lead pitch, the height of the outer edge of the insulation screw does not vary. This type of insulation screw requires a more complicated moulding tool and is thus less cost-efficient.

Figure 5:
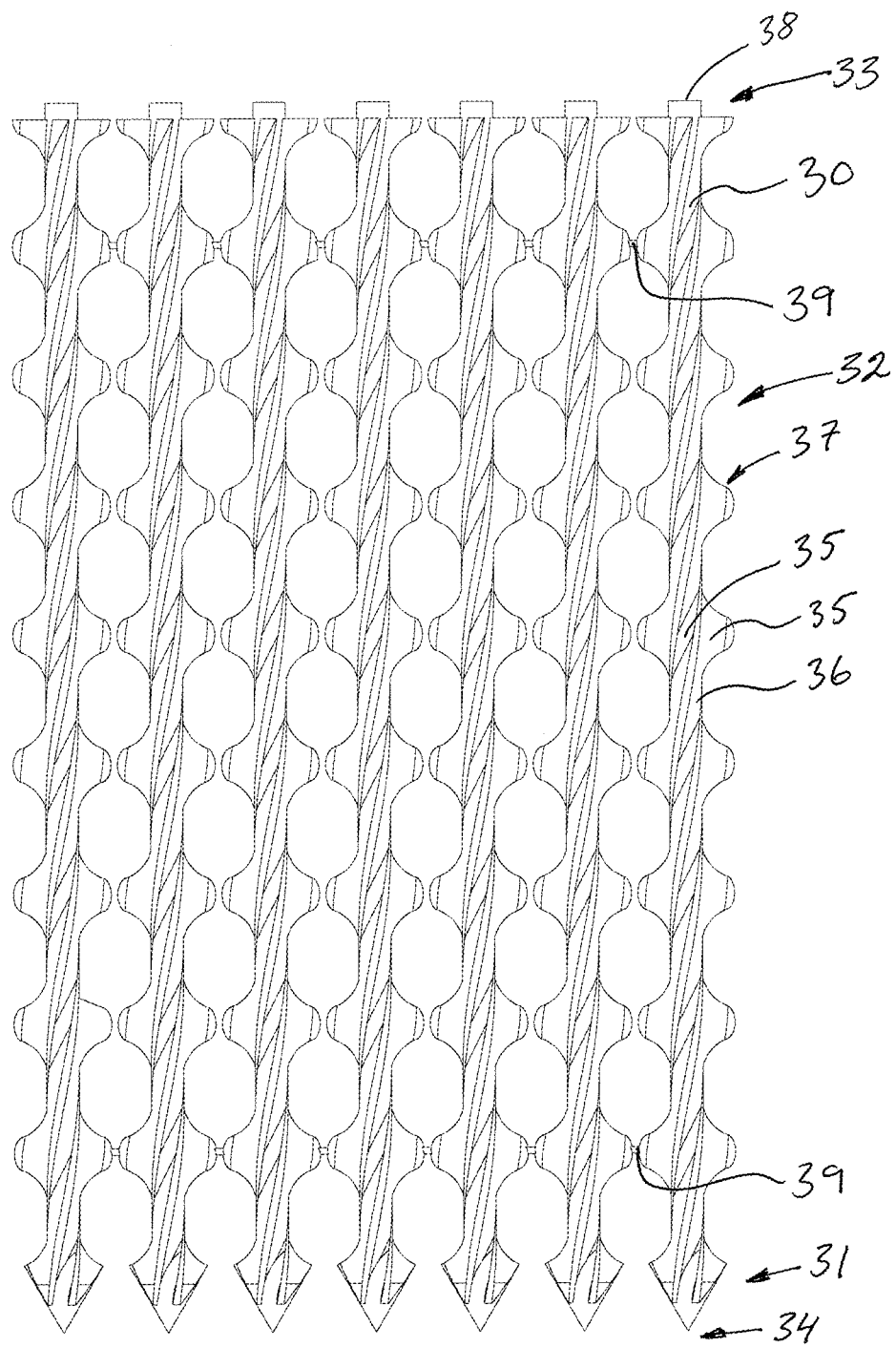
FIG. 5 shows an example of connected insulation screws according to the invention.

FIG. 5 shows an example of a strip of insulation screws connected to each other with connection strips 39. An advantage of moulding insulation screws in a two-part injection tool is that several insulation screws can be injection moulded at the same time, with connecting strips 39 between the insulation screws that connect the insulation screws to each other. The connecting strips will thus be of the same material as the insulation screws. A strip of connected insulation screws may e.g. be used in a magazine for automated feeding of the insulation screws. By moulding the insulation screws and the connecting strips at the same time and in the same material, a cost-effective strip of insulation screws is provided, where the insulation screws must not be attached to each other with another type of connecting strips in a separate process.

Figure 6:
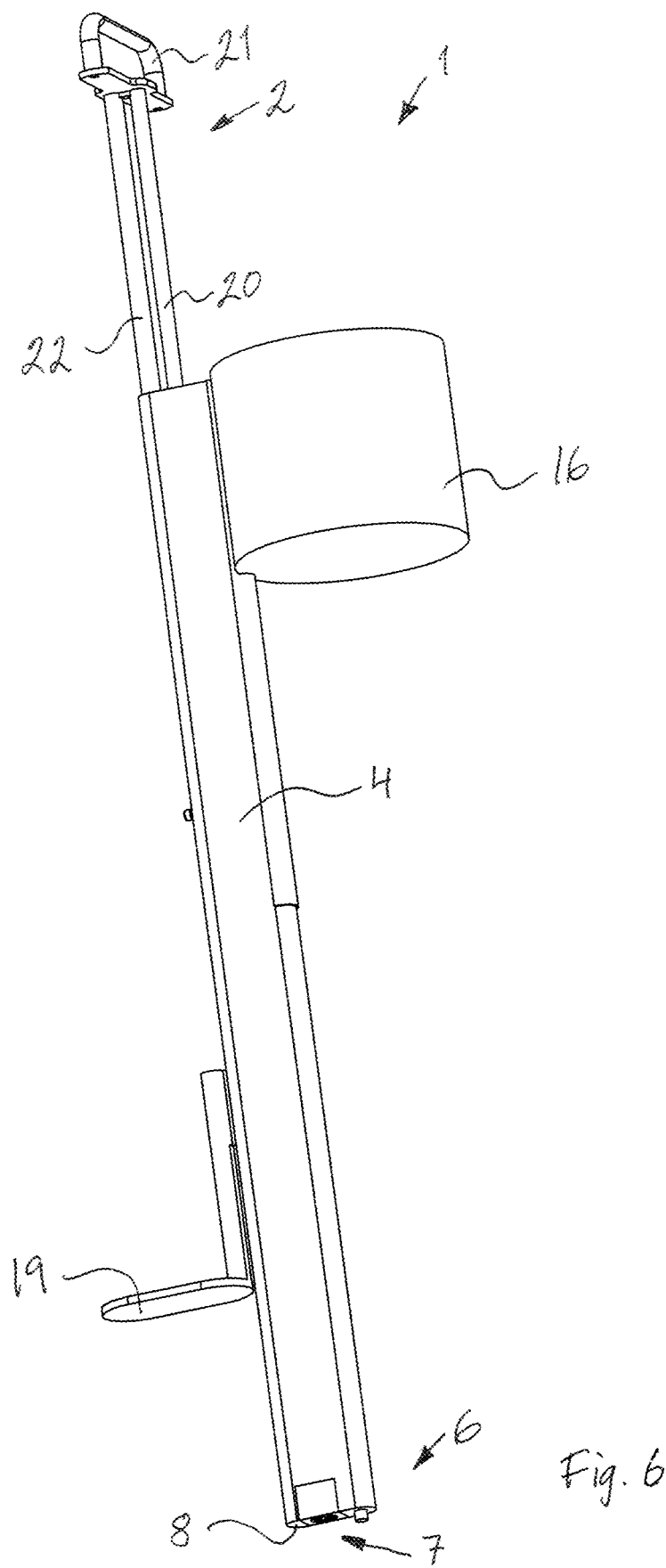
FIG. 6 shows a mounting device adapted to insert an insulation screw according to the invention.
Figure 7:
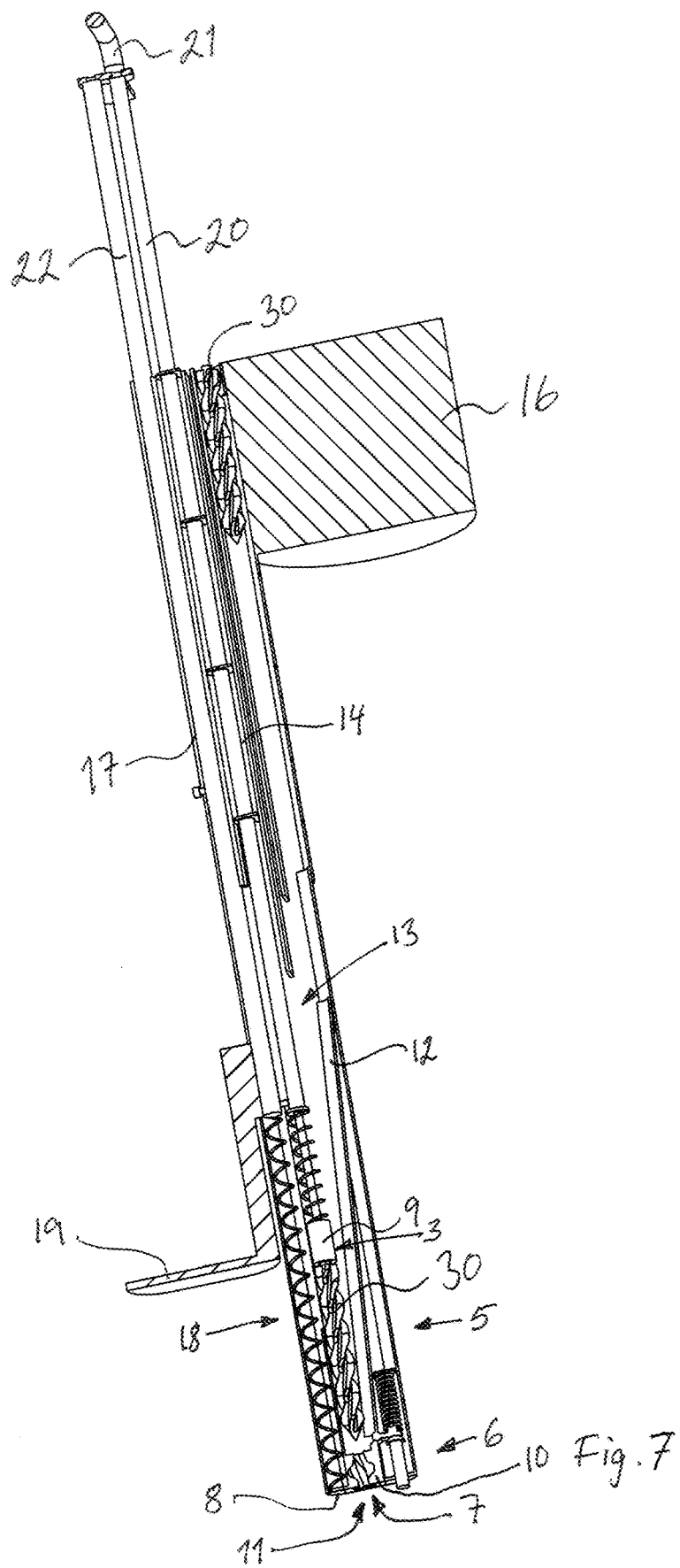
FIG. 7 shows a cut view of the mounting device.

FIGS. 6 and 7 show a mounting device adapted to insert an insulation screw according to the invention. The mounting device 1 comprises a body 4 which forms the body of the mounting device. The body is in the shown example injection moulded in a plastic material. The body comprises in this example a central channel 14, a second channel 15 and a third channel 17. The central channel is adapted to hold and guide the drive head 3 which is connected to a handle 21 through a first rod 20 which is supported by the central channel. The second channel is adapted to guide an insulation screw 30 from an upper insertion position to a receiving position 5 in the central channel 14. The central channel is provided with a longitudinal slot 13 between the central channel and the second channel, through which an insulation screw can be transferred to the receiving position. In the receiving position, the insulation screw will rest with the tip at the central opening.

The body is provided with a head portion 6 at the lower end of the mounting device. The head portion is provided with a bearing surface 8 adapted to bear on the insulation material when an insulation screw is inserted. The head portion further comprises an insert 10 comprising the central opening through which the insulation screws are inserted. The central opening is provided with a threaded portion 11 adapted to rotate an insulation screw during the insertion. The threaded portion 11 is provided with a thread corresponding to the insulation screw that is to be used. The lead pitch of the threaded portion is at least 30 millimetres. The insert may be removable such that it can be replaced if it is worn, or if an insulation screw with another thread is to be used. The length of the threaded insert is preferably long enough to be able to support the insulation screw during insertion of the insulation screw into the insulation material. The length of the insert may e.g. correspond to the thread pitch of an insulation screw, or to a quarter of the lead pitch of an insulation screw.

The drive head 3 is in the shown example provided with a coaxial bushing 9 which is arranged around the drive head. The bushing is mounted to the drive head in a resilient manner, such that the bushing can move up and down in a vertical direction on the drive head. In a start position, where the drive head is in its highest position, the lower edge of the bushing will extend somewhat below the bearing surface of the drive head. In this way, the insulation screw will be held in a secure way, where the head of the insulation screw is enclosed by the bushing. The upper part of the insulation screw will thus be supported in a sideway direction during the insertion.

The third channel 17 is adapted for a foot pedal 19. The foot pedal is mounted through a slit 18 in the third channel to a second rod 22 suspended in the third channel. The second rod 22 is connected to the handle 21. In this way, the foot pedal or the handle can be used to push the drive head downwards. The foot pedal may be advantageous when larger insulation screws are used, or when an insulation material having a higher density is used. The length of the slit 18 in the third channel 17 is preferably adapted to the longest of the different insulation screws that are to be used. By providing the second rod with e.g. threaded holes, it is possible to set the start position and the end position of the drive head by inserting screws in corresponding threaded holes. The slit for the start/end adjustment may be the same as for the foot pedal, or may be another slit arranged closer to the handle. The start/end adjustment may also be made in other ways, e.g. by using an adjustable cover over the slit 18.

The drive head has a stroke length corresponding to the longest insulation screw that is to be inserted. The length of an insulation screw may e.g. vary between 5 cm to up to 40 cm. The stroke length of the drive head is thus preferably in the same region. By adjusting the stroke length of the drive head to the actual length of an insulation screw, no excessive travel of the drive head must be performed every time an insulation screw is inserted.

An insulation screw is in the shown example inserted into the second channel, which is adapted to guide an insulation screw 30 from an upper insertion position to a receiving position 5 in the central channel 14. The upper insertion position may be provided with e.g. a funnel in order to simplify the feeding of insulation screws to the second channel. The insulation screw is inserted into the upper part of the second channel and falls down to the central channel to the receiving position, through the longitudinal slot 13 provided between the central channel and the second channel. In the receiving position, the insulation screw will rest with the tip at or in the central opening. It is possible to provide the central opening or the receiving position with a holder means of some kind that will hold the insulation screw in the receiving position before the insulation screw is inserted. This will secure that an insulation screw does not fall through the central opening by gravity.

The mounting device may also be provided with a magazine 16 arranged at the second channel, e.g. at the insertion position at the upper part of the second channel. The magazine is preferably removable, such that it can easily be attached to and removed from the mounting device. The magazine is adapted to hold a plurality of insulation screws, e.g. 50 or more. The magazine may be loaded with insulation screws at a remote place, or may be loaded by the user at e.g. the building site. In one example, the insulation screws are provided in a package that can be inserted directly into the magazine. Every time the drive head returns to its start position, a new insulation screw is released from the magazine by a release means, e.g. operated by a pin provided on the first rod 20. In FIG. 8, one insulation screw is shown at the receiving position 5, and one insulation screw is shown at the insertion position of the second channel, in the magazine. In a mounting device comprising only the central channel, the magazine will release the insulation screws directly to the central channel.

The mounting device is further provided with a positioning means 12 which is adapted to push the insulation screw completely into the receiving position before an insulation screw is inserted. The positioning means is operated by a spring-loaded pin that extends out of the bearing surface of the head portion. When the bearing surface bears on the insulation material, the pin is pushed upwards which causes the positioning means to pivot around its lower part, which causes the upper part to swing inwards. This will push the upper part of the insulation screw into the central channel, to a position where the insulation screw is aligned with the drive head 3 and the bushing 9.

It is also possible to use a mounting device having only a central channel, where the insulation screws are fed directly from a magazine to the receiving position of the centre channel. The central channel is provided with a longitudinal slot through which an insulation screw can be transferred to the receiving position from a magazine. In the receiving position, the insulation screw will rest with the tip at the central opening. The magazine is in this example positioned at the lower part of the mounting device, close to the receiving position for the insulation screw.

When an insulation screw is to be inserted, the mounting device is positioned at the position where the insulation screw is to be inserted. If an insulation screw is already present in the receiving position, the drive head is pushed downwards, either by the use of the handle or by the foot pedal. The drive head will push the insulation screw downwards through the central opening. The thread of the insulation screw and the threaded portion of the central opening will interact, such that the insulation screw will rotate through the central opening. In this way, the insulation screw will be screwed down into the insulation material. When most of the insulation screw is inserted into the insulation material, the bushing will reach the upper side of the insert. The bushing will stop at the upper side of the insert, and the drive head will continue to push the insulation screw through the threaded portion of the central opening until the drive head has passed the threaded portion of the central opening.

An insulation screw may also enter the central channel directly through a slot in the central channel. The insulation screws are preferably attached to each other by small connecting strips that hold the insulation screws together. The first insulation screw extends into the central channel when the drive head is in its upper position. The second insulation screw is held in a fixed state by a holding means, arranged in either the mounting device or the magazine. When the drive head is lowered, the connecting strips are cut such that the first insulation screw is disconnected from the rest of the insulation screws. The insulation screw enters the central opening and is inserted into the insulation material by the drive head. The tip of the insulation screw is arranged close to the central opening of the insert, i.e. at the receiving position. The magazine is in this example arranged at the lower part of the mounting device.

Since it is possible to adjust the end position of the drive head somewhat, the drive head may stop when the insulation screw is not completely inserted into the insulation material, or when the insulation screw is pushed down into the insulation material with a few extra centimetres. Depending on the type of insulation screw, the head of the insulation screw may not be provided with a thread. Different inserts may also be used in order to adapt the insertion depth of the insulation screw. In one example, the head is e.g. 1 centimetre long, and this head may extend out of the insulation material when the insulation material should be secured to the concrete.

In another example of a mounting device 1 according to the invention, the drive means 2 is an electric motor (not shown) arranged at the upper part of the mounting device. The motor may be an integrated motor or may be a conventional electric screwdriver that is attached to the mounting device by an attachment means. The motor drives the drive head downwards in the same way as described above. The rotation of the motor is transferred to a linear motion by e.g. an internal thread in the central channel. The drive head is in this example preferably provided with a spring-loaded return mechanism that releases when the drive head reaches the end position and returns the drive head to the start position without having to drive the drive head back with the motor. This will save time. In this example, the handle and the foot pedal are not necessary, and the third channel may also be removed.

The invention is not to be regarded as being limited to the embodiments described above, a number of additional variants and modifications being possible within the scope of the subsequent patent claims.

REFERENCE SIGNS

1: Mounting device
2: Drive means
3: Drive head
4: Body
5: Receiving position
6: Head portion
7: Central opening
8: Bearing surface
9: Bushing 10: Insert
11: Threaded portion
12: Positioning means
13: Slot
14: Central channel
15: Second channel
16: Magazine
17: Third channel
18: Slit
19: Foot pedal
20: First rod
21: Handle
22: Second rod
30: Insulation screw
31: Tip
32: Body
33: Head
34: Point
35: Thread
36: Core
37: Edge
38: Pushing surface
39: Connecting strip

What is claimed is:

1. An insulation screw adapted to be inserted by a mounting device into insulation material, the insulation screw comprising:
 a body provided with at least one thread;
 a pointed tip at one end of the body, which is configured to be inserted into the insulation material by the mounting device;
 a head at the other end of the body, comprising a pushing surface configured to be pushed by a drive head of the mounting device to insert the insulation screw into the insulation material,
 wherein a dimension of the pushing surface is smaller than a cross section of the body,
 and
 wherein a lead pitch of the at least one thread of the insulation screw is at least 30 millimetres,
 wherein the at least one thread is offset from the pushing surface at the other end of the body.

2. The insulation screw according to claim 1, wherein the body consists of a core which is provided with the at least one thread.

3. The insulation screw according to claim 2, wherein the core of the insulation screw is solid.

4. The insulation screw according to claim 1, wherein the at least one thread comprises two threads.

5. The insulation screw according to claim 1, wherein the at least one thread comprises three threads.

6. The insulation screw according to claim 1, wherein the at least one thread comprises four threads.

7. The insulation screw according to claim 2, wherein a height of the outer edge of the at least one thread from the core varies along the insulation screw.

8. The insulation screw according to claim 1, wherein the ratio between an outer diameter of the insulation screw and the core of the insulation screw is less than 40%.

9. The insulation screw according to claim 1, wherein the pushing surface of the insulation screw is convex.

10. The insulation screw according to claim 1, wherein the insulation screw is injection moulded in a two part injection tool.

11. The insulation screw according to claim 1, wherein the insulation screw is provided with connecting strips connecting the insulation screw to another insulation screw.

12. The insulation screw according to claim 11, wherein the insulation screws and the connecting strips are made from the same material.

13. A method for inserting an insulation screw having a lead pitch of at least 30 millimetres into insulation material using a mounting device comprising an opening provided with a threaded portion corresponding to a thread of the insulation screw, the method comprising:
 placing the insulation screw inside the mounting device such that a tip of the insulation screw is arranged at the opening of the mounting device,
 placing the mounting device to bear against the insulation material,
 driving the insulation screw completely through the opening of the mounting device.

14. The method according to claim 13, wherein the insulation screw is driven by a drive tool which is a manually operated handle, a pedal or a motor.

* * * * *